K. GAMMEL.
MACARONI DIE PLATE.
APPLICATION FILED MAR. 12, 1914.
1,138,101.                              Patented May 4, 1915.
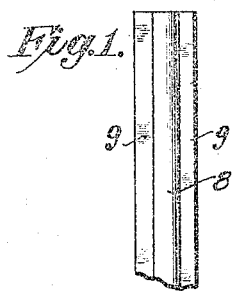
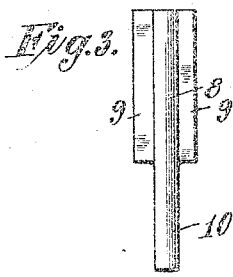
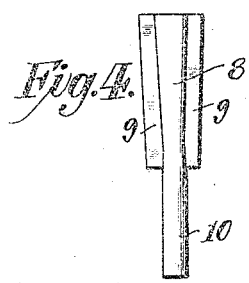
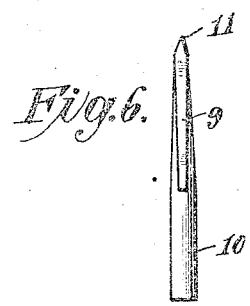
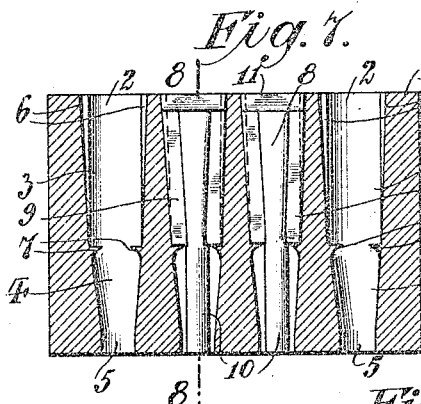
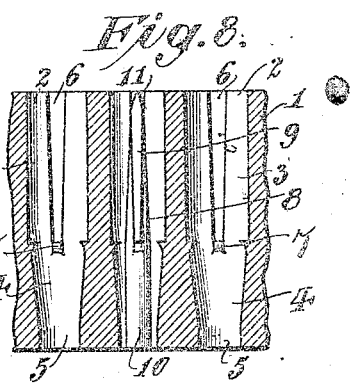
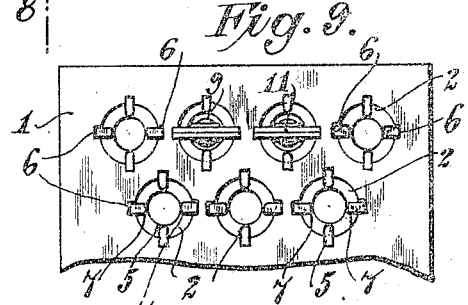
WITNESSES                                    INVENTOR
                                          Karl Gammel
                                         BY
                                            ATTORNEYS

UNITED STATES PATENT OFFICE.

KARL GAMMEL, OF CLEVELAND, OHIO.

MACARONI DIE-PLATE.

1,138,101.　　　Specification of Letters Patent.　　Patented May 4, 1915.

Application filed March 12, 1914. Serial No. 824,080.

*To all whom it may concern:*

Be it known that I, KARL GAMMEL, a subject of the Emperor of Germany, residing in the city of Cleveland, county of Cuyahoga, and State of Ohio, have invented certain new and useful Improvements in Macaroni Die-Plates, of which the following is a specification.

My invention relates to the die plates or molds forming part of a press used for forming macaroni and other tubular edible pastes and particularly relates to the mounting of the removable die pins which are centered in the tube-forming openings in these plates.

The dough used in the presses is usually stiff and great pressure is necessary to force the same through the openings in the die plates and in order to withstand this pressure the plates must be made of some material thickness to withstand bending especially where the openings are disposed relatively close to each other. With a thick plate of this character great resistance is offered to the passage of the dough and where die pins are also centered in the openings the friction is materially increased.

Accordingly, it is one of the objects of the invention to provide a plate which may have a relatively large number of openings each designed so that the dough may be forced therethrough with the least possible resistance.

Where the openings are of small cross-sectional area, the pins must be correspondingly small and yet must be so mounted that they will remain centered irrespective of the bending tendency of the dough as it is forced through the openings, so that another object of this invention is to provide a long thin pin so mounted in the opening that it can resist bending moments and at the same time offer the least resistance to the passage of the dough.

Another object is to so mount the pins that they will automatically center as they are dropped into position without any special care being exercised in inserting the same, and without any necessity of providing accurately milled parts to support the pins in their centered position.

A still further object of the invention is to provide a die plate which will form the stiff paste into long tubes of relatively small diameter compared with the edible paste tubes, now known, which will form the tubes with a thin wall having a smooth surface on both the inner and outer sides, and which will provide a wall of uniform thickness throughout the length of the tube.

Various other objects and advantages of the invention will be in part obvious from an inspection of the accompanying drawings and in part will be more fully set forth in the following description of one form of mechanism embodying the invention, and the invention also consists in certain new and novel features of construction and combination of parts hereinafter set forth and claimed.

In the accompanying drawings: Figure 1 is a side elevation of a die pin in the course of construction and illustrating a physical embodiment of the pin element of my invention; Fig. 2 is a transverse sectional view which may be considered as taken through the webbed portion of any of the pins shown in Figs. 1 to 6 inclusive; Fig. 3 is a view similar to Fig. 1 showing the lower portion of the webs cut-away to form the cylindrical portion of the pin; Figs. 4 and 5 are respectively front and side elevations of a preferred form of die pin; Fig. 6 is a view similar to Fig. 5 showing a sharp edge top to the pin; Fig. 7 is a vertical sectional view through a portion of a die plate showing a couple of pins centered in the openings therein; Fig. 8 is a transverse section taken on the line 8—8 of Fig. 7; and Fig. 9 is a plan view looking down upon the plates shown in Figs. 7 and 8.

In the drawings is shown a plate 1 such as is usually found in the bottom of presses used in the manufacture of macaroni and other tubular edible pastes, which plate is designed to have a thickness capable of withstanding the enormous pressure to which these plates are subjected in machines of this character.

This plate has a plurality of tube-forming openings 2 extending therethrough, which openings are disposed as close to each other as possible to produce the maximum number of paste tubes with each operation of the press. The portion of the opening 2 which first receives the dough as it is forced therethrough, that is, the upper portion in the device illustrated, is cylindrical as shown at 3; the remaining portion is substantially frusto-conical as shown at 4 except that the lower smaller end may merge into a relatively short annular exit 5.

The wall forming the cylindrical portion of the opening has a pair of diametrically disposed relatively long slots 6 therein, the outer ends of which are opened to the adjacent face or top of the plate. These slots are preferably rectangular in cross-section and decrease in cross-section area from the outer toward the inner ends thereof. The sides of the slot gradually converge toward the bottom so that the distance between these sides at the outer end of the slots is greater than the distance adjacent the inner ends thereof, thus forming a wedging pocket for the pins hereinafter described.

Projecting ribs 7 extend inwardly from the wall adjacent the bottom of these slots so as to provide a seat for the inner ends of webs which form part of these pins, and assist to transfer strains on the pins direct to the plate.

Removably positioned within the openings 2 and preferably of a length equal to the thickness of the plate are die pins 8, which pins have diametrically disposed relatively thin webs 9 extending outwardly from the upper portion thereof. These webs are adapted to seat within the slots 6 and are made as long as possible in order to brace the pin against twisting or bending strains and yet leave the cylindrical or tube-forming portion of the pin as long as possible. The lower portions 10 of the pins are preferably cylindrical but may have any other suitable configuration depending upon the character of the bore desired for the edible paste tubes. The webs 9 preferably have a cross-section substantially equal to the cross-section of the slots 6, but it is not necessary that the inclination of the sides of the webs be equal to that of the slots for any angle which will provide a wedging engagement between the webs and slots in the direction of movement of the dough through the opening is sufficient.

In order to reduce friction and to divide the dough as it passes into the opening, the upper end of the pins are formed into knife edges 11 by flattening oppposite sides of the upper portion of the pin.

The pins are preferably of bronze or nickle steel which may be cold rolled into the form shown in Fig. 1 after which a part of the flanges are removed to form the pins shown in Fig. 3, or the end of suitable cylindrical rods may be inserted in rollers designed to give the flattened end and beveled web structure shown in Figs. 4 and 5 after which the outer end may be sharpened to form the edge 11.

In operation, the plate after it has been cleaned, is positioned in the press as is usual with devices of this character and the pins are dropped into the openings with their webs positioned in the slots and resting on the seats provided by the ribs 7. The dough is forced through the cylindrical portion 3 about opposite sides of the flattened portion of the pin and then closes around the cylindrical portion within the tapered bore 4 to form the tubular edible paste members. The action of the dough passing through the openings tends to firmly seat the pins on the projections 7 but in case the inclination of the webs and slots are such that the webs of the pins are held in wedged position off the seats, the pins are still centered in position and cannot be worked loose under the action of the dough, and this result may be obtained even though the interfitting parts are not accurately milled. As the webs are fitted within the slots, rotary movement of the pins is thus prevented and any tendency of the pins to set up an oscillatory movement is minimized. The long bearings provided by the edge of the webs tend to maintain the pins in centered position so as to provide a uniform thickness to the wall of the paste tube. This construction, using but two wings, offers the least possible interruption to the passage of the dough and, at the same time, firmly suspends the pin in position and also obtains the bracing effect afforded by a relatively deep ribbed plate.

The pins may be readily removed by gently tapping their cylindrical ends and can be easily cleaned when removed as there are no recesses within which the dough can collect and harden. The flat webs permit the use of rotary cleaning brush and the cylindrical portion may be readily polished to give a clean smooth interior to the bore of the paste tube.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:

1. A die plate having an opening therethrough, one portion of said opening being substantially cylindrical and the remaining portion being substantially frusto-conical, the wall outlining the cylindrical portion of said opening having oppositely disposed slots therein adapted to receive the webs of a die pin positioned in said opening.

2. A die plate having an opening therethrough, one portion of said opening being substantially cylindrical and the remaining portion being substantially frusto-conical, the wall outlining the cylindrical portion of said opening having oppositely disposed slots therein, said slots having one end opened to the outside of the plate and converging from said open end to the opposite end thereby to form wedging seats adapted to receive the webs of a die pin centered in said opening.

3. A die plate for use in manufacturing edible pastes, said plate having an opening of relatively small diameter extending therethrough, said plate having oppositely disposed seats inset from said opening and adapted to center a die pin in said opening with a minimum obstruction to the passage of the paste therethrough.

4. In a device of the class described, the combination with a die plate having an opening extending therethrough, said opening having a portion of uniform cross-sectional area, of a die pin removably centered within said opening, and having portions thereof set within the wall outlining the portion having the uniform cross-sectional area.

5. In a device of the class described, the combination with a die plate having an opening extending therethrough, of a die pin removably positioned in said opening, said plate engaging portions of said pin to prevent rotary movement of the same within said opening.

6. A die pin comprising a substantially cylindrical rib with opposite sides of one end being flattened to form a beveled end and wedging ribs extending outward from said flattened end and paralleling the same.

7. In a device of the class described, a die plate having an opening extending therethrough, diametrically disposed ribs projecting toward each other within said opening and adapted to provide a seat to support a die pin removably positioned in said opening.

8. In a device of the class described, the combination with a die plate having an opening therethrough for the passage of the dough, of a die pin removably positioned within said opening and a connection between said plate and pin preventing rotary movement of said pin.

This specification signed and witnessed this 28th day of February, A. D. 1914.

KARL GAMMEL.

Witnesses:
J. H. VAN DERVEER,
L. D. COLLAR.